J. H. MELICK.
Thrashing Machine.
No. 57,541.
Patented Aug. 28, 1866.
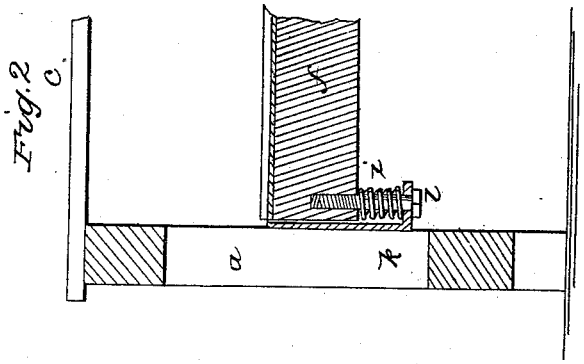
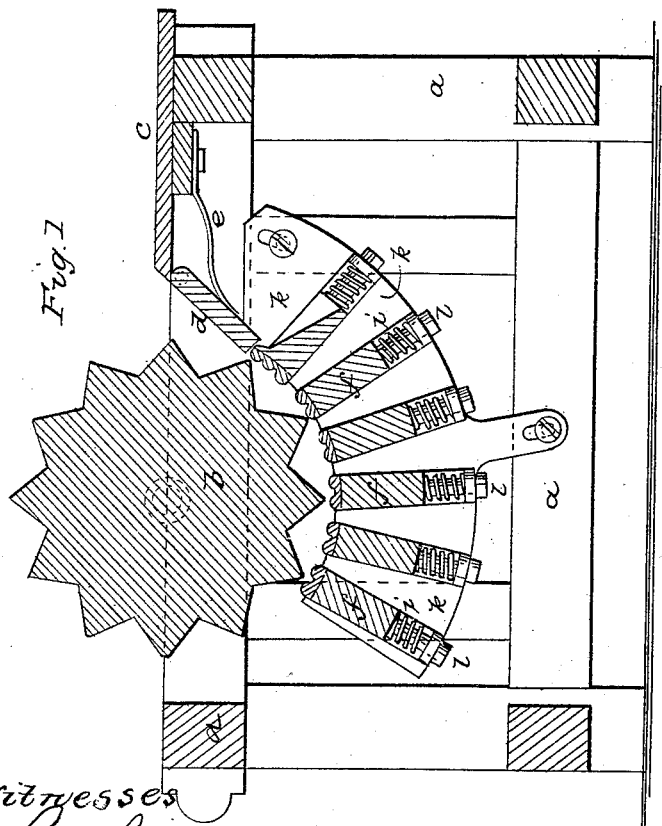

UNITED STATES PATENT OFFICE.

JAMES H. MELICK, OF ALBANY, NEW YORK.

IMPROVEMENT IN THRASHING-MACHINES.

Specification forming part of Letters Patent No. 57,541, dated August 28, 1866.

*To all whom it may concern:*

Be it known that I, JAMES H. MELICK, of the city and county of Albany, and State of New York, have invented, made, and applied to use a certain new and useful Improvement in Thrashing-Machines; and I do hereby declare the following to be a full, clear, and exact description of my said invention, reference being had to the annexed drawings, making part of this specification, wherein—

Figure 1 is a vertical section transversely of the cylinder, and Fig. 2 is a section near the end of one of the bars forming the inclined concave rubber.

Similar marks of reference denote the same parts.

Thrashing-machines have heretofore been made with a rotary cylinder armed with ridges or ribs acting within or at the side of a stationary concave, the straw or grain being fed in laterally or nearly parallel to the axis of the thrashing-cylinder. The concave or rubber has also been made adjustable and slightly yielding as a whole.

In feeding in the grain a bunch or mass of straw passing through at once, in consequence of careless feeding or accidents, prevents the perfect thrashing of the grain in such mass and of that immediately following. In case of a stick, stone, or piece of rope passing into the thrashing-machine the straw passing through at the same time will not be perfectly thrashed, and injury is likely to result to the concave or to the thrashing-cylinder.

The nature of my said invention consists in forming the concave or rubber of a series of separate spring-bars, that act to open any bunch or mass of straw fed into the machine, and, although yielding for the passage of the same, close up to the regular distance, one after another, as such bunch passes, thereby maintaining the distance necessary for the thorough thrashing and cleaning of the grain from the straw; and I provide a yielding incline, over which the material passes to the concave or rubber, so that any foreign substance, such as a stone or stick, will be forced out between the edge of such yielding incline and the concave or rubber, and thereby be prevented from damaging the machine.

In the drawings, $a$ is the frame of the machine; $b$, the thrashing-cylinder, formed of ribs or ridges of any desired character. $c$ is the table upon which the sheaf or bundle is laid and opened and fed in crosswise or laterally between the incline $d$ and the cylinder $b$. This incline $d$ is hinged at or near its upper edge, so that the lower edge may be moved away to form an opening, through which any foreign substance, such as a stone or stick, may escape, and said incline is kept up by a spring, $e$, or equivalent device.

$f f$ are a series of bars formed with ribbed upper surfaces, protected by metallic bars or other suitable devices for forming a thrashing-surface. Each bar is set at the ends in slides or supports that keep them in position, and springs $i$ $i$ are provided, pressing said bars toward the thrashing-cylinder.

$l$ $l$ are adjusting-screws passing through the bottom of the slides $k$, and into the bars $f$, whereby their proximity to the thrashing-cylinder can be determined and any wear upon the surface of the bars compensated.

What I claim, and desire to secure by Letters Patent, is—

1. A series of bars, each fitted to yield separately and radially, and forming the concave or rubber, in combination with the revolving thrashing-cylinder, as set forth.

2. A yielding incline, $d$, between the feeding-table and the concave or rubber, substantially as and for the purposes set forth.

3. The arrangement of the slides $k$, springs $i$, and adjusting-screws $l$ to the yielding bars $f$ of the concave or rubber, as specified.

In witness whereof I have hereunto set my signature this 18th day of December, 1865.

JAMES H. MELICK.

Witnesses:
 ED. GRESHAM,
 ENOCH C. HARTPENCE.